(12) United States Patent
Brandwine et al.

(10) Patent No.: US 9,094,297 B2
(45) Date of Patent: *Jul. 28, 2015

(54) WIDE AREA NETWORK MONITORING

(71) Applicant: Amazon Technologies, Inc., Reno, NV (US)

(72) Inventors: Eric Jason Brandwine, Haymarket, VA (US); Swaminathan Sivasubramanian, Seattle, WA (US); Bradley E. Marshall, Bainbridge Island, WA (US); Tate Andrew Certain, Seattle, WA (US); Alan M. Judge, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 5 days.

This patent is subject to a terminal disclaimer.

(21) Appl. No.: 14/105,647

(22) Filed: Dec. 13, 2013

(65) Prior Publication Data

US 2015/0089049 A1    Mar. 26, 2015

Related U.S. Application Data

(63) Continuation of application No. 12/826,520, filed on Jun. 29, 2010, now Pat. No. 8,612,576.

(51) Int. Cl.
*G06F 15/173* (2006.01)
*H04L 12/26* (2006.01)
*H04L 29/08* (2006.01)

(52) U.S. Cl.
CPC .......... *H04L 43/08* (2013.01); *H04L 29/08072* (2013.01)

(58) Field of Classification Search
CPC .................................... H04L 43/08

USPC .................................. 709/224, 223
See application file for complete search history.

(56) References Cited

U.S. PATENT DOCUMENTS 6,681,232 B1 * 1/2004 Sistanizadeh et al. ........... 1/1
2006/0262776 A1 11/2006 Pollock

OTHER PUBLICATIONS

Counter Hack Reloaded a Step-By-Step Guide to Computer Attacks and Effective Defenses, Second Edition, Ed Skoudis, et al., dated Nov. 2006, pp. 59-66.
How the 'Net works: An Introduction to Peering and Transit; Rudolph van der Berg; dated Sep. 2, 2008.
VL2: A Scalable and Flexible Data Center Network; Albert Greenberg, et al.; dated Aug. 2009.
Cisco Policy Based Routing White Paper; accessed Jun. 7, 2010.

(Continued)

*Primary Examiner* — Dustin Nguyen
*Assistant Examiner* — Joel Mesa
(74) *Attorney, Agent, or Firm* — Knobbe, Martens, Olson & Bear, LLP

(57) ABSTRACT

As exterior routing protocols generally do not provide information about the internal routing paths of an autonomous system, a particular autonomous system has limited information about the internal health of other autonomous systems. However, if a monitoring system has access to routing data and/or other network data from multiple points of an autonomous system, the monitoring system can estimate, with some accuracy, the health of the autonomous system. In turn, by monitoring at least some of autonomous systems forming a larger internetwork, such as the Internet, the monitoring system can estimate the overall health of at least portions of the internetwork.

20 Claims, 5 Drawing Sheets

(56) References Cited

OTHER PUBLICATIONS

Internet Security Systems, Distributed Denial of Service Attack Tools; accessed Jun. 7, 2010.

B. Pfaff, et al., Extending Networking into the Virtualization Layer, Proceedings of the $8^{th}$ ACM Workshop on Hot Topics in Networks (HotNets—VIII), New York City, New York (Oct. 2009).
Towards a Next Generation Data Center Architecture: Scalability and Commoditization; Albert Greenberg, et al.; dated Aug. 22, 2008.

* cited by examiner

WIDE AREA NETWORK MONITORING

CROSS-REFERENCE TO RELATED APPLICATIONS

This application is a continuation of U.S. application Ser. No. 12/826,520, filed Jun. 29, 2010 and entitled "WIDE AREA NETWORK MONITORING," the disclosure of which is hereby incorporated by reference in its entirety.

BACKGROUND

Generally described, computing devices utilize a communication network, or a series of communication networks, to exchange data. In a common embodiment, data to be exchanged is divided into a series of packets that can be transmitted between a sending computing device and a recipient computing device. In general, each packet can be considered to include two primary components, namely, control information and payload data. The control information corresponds to information utilized by one or more communication networks to deliver the payload data. For example, control information can include source and destination network addresses, error detection codes, and packet sequencing identification, and the like. Typically, control information is found in packet headers and trailers included within the packet and adjacent to the payload data.

In practice, in a packet-switched communication network, packets are transmitted between multiple physical networks, or sub-networks. Generally, the physical networks include a number of hardware devices that receive packets from a source network component and forward the packet to a recipient network component. The packet routing hardware devices are typically referred to as routers. Generally described, routers can operate with two primary functions or planes. The first function corresponds to a control plane, in which the router learns the set of outgoing interfaces that are most appropriate for forwarding received packets to specific destinations. The second function is a forwarding plane, in which the router sends the received packet to an outbound interface.

For ease of administration, routers on large internetworks such as the Internet are typically grouped into autonomous systems (ASes) that are independently controlled by different organizations and companies. Interior routing protocols such as RIP and OSPF are used to communicate routing information between routers within an autonomous system while exterior routing protocols, such as BGP, communicates routing information between ASes.

Generally, the details of what happens within an AS are hidden from other ASes, providing the AS administrator with independent control of the AS, including the selection of an interior routing protocol from a variety of different interior routing protocols. In contrast, in order to reliably connect ASes together, different ASes run compatible exterior routing protocols.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

As exterior routing protocols generally do not provide information about the internal routing paths of an autonomous system (AS), a particular AS has limited information about the internal health of other ASes. However, if a monitoring system has access to routing data and/or other network data from multiple points of an AS, the monitoring system can estimate, with some accuracy, the health of the AS. In turn, by monitoring at least some of ASes forming a larger internetwork, such as the Internet, the monitoring system can estimate the overall health of at least portions of the internetwork.

Network status or health information, such as route availability, congestion, load, or the like, can be useful in making route selection choices between ASes. For example, network traffic can be routed to a healthier ASes if a routing path in the original AS goes down. In addition, such information can be used to diagnose connectivity problems of the networks connected to the AS. Network health information can also provide an early warning of network attacks by tracking network outages and/or slowdowns.

In one embodiment, a system for determining the network status of a wide area network is provided, the system comprising: a router in communication with one or more autonomous systems, the router configured to receive external routing data for an autonomous system, such as information on the autonomous system's network connections; a computing system in communication with client networks distinct from and connected to the autonomous system, wherein the computing system receives internal routing data providing information on the autonomous system's network connections from the client networks; and a monitoring module in communication with the router interface and the computing system, wherein the monitoring module determines network health of at least a portion of the autonomous system based on the information from the external and internal routing data.

Figure 1:
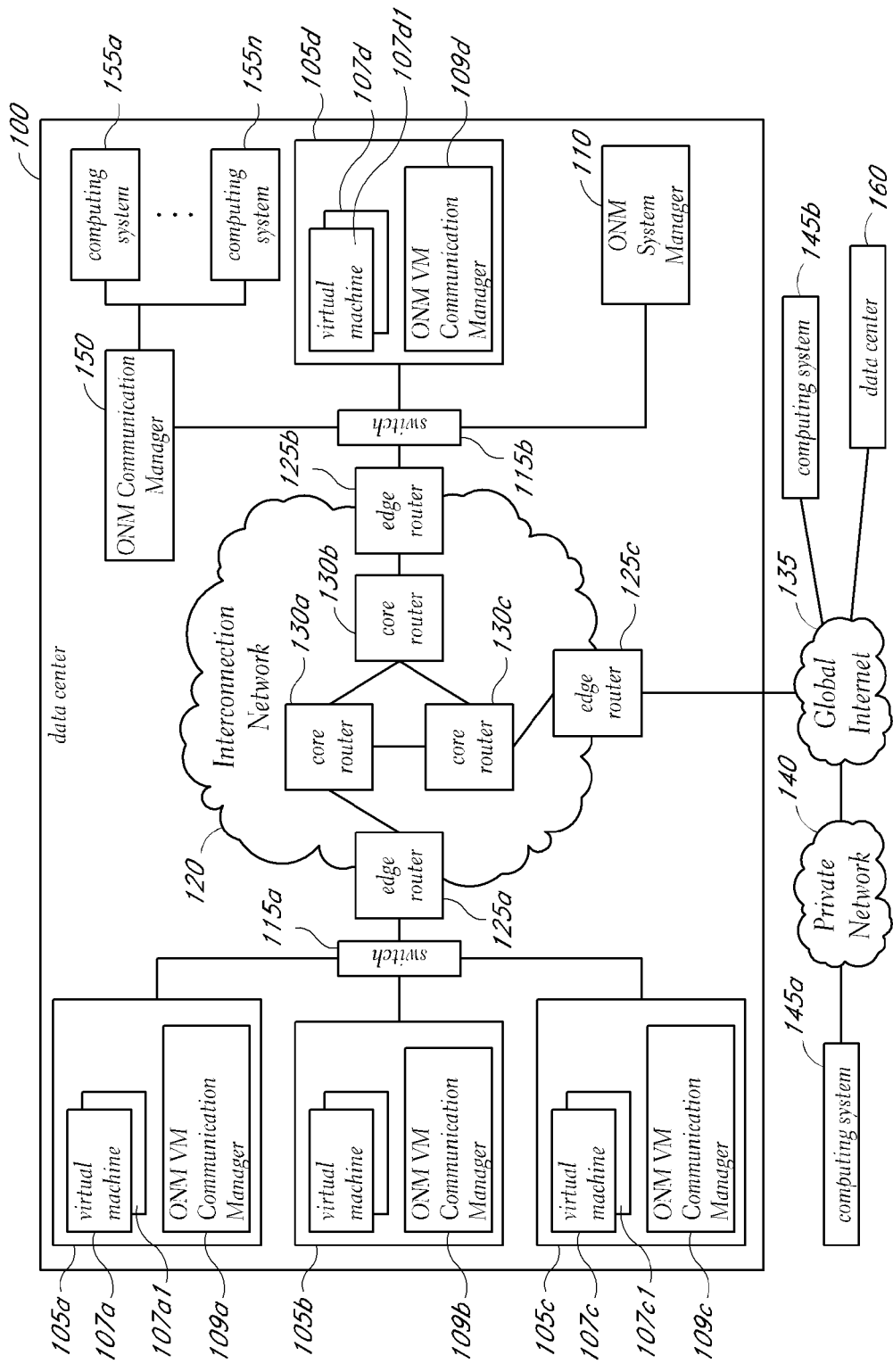
FIG. 1 is a network diagram illustrating an embodiment of a virtual network provider.

FIG. 1 is a network diagram illustrating an embodiment of a virtual network provider. A virtual network provider can provide virtual networks to one or more clients. As separate clients have physical networks located in several network locations and connected to various ASes, these user networks can be used to collect additional information about connected ASes. In FIG. 1, the configuring and managing of the communications is facilitated by a system manager module and multiple communication manager modules of an embodiment of the Overlay Network Manager (ONM) system. The system manager module can include a wide area network status module that monitors the status of other autonomous systems in order to determine the network health of those systems.

The illustrated example includes an example data center 100 with multiple physical computing systems operated on behalf of the ONM system. The example data center 100 is connected to a global internet 135 external to the data center 100. The global internet can provide access to one or more computing systems 145a via private network 140, to one or more other globally accessible data centers 160 that each have multiple computing systems, and to one or more other computing systems 145*b*. The global internet 135 can be a publicly accessible network of networks, such as the Internet, and the private network 140 can be an organization's network that is wholly or partially inaccessible from computing systems external to the private network 140. Computing systems 145*b* can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105*a*-105*d* and 155*a*-155*n*, as well as a Communication Manager module 150 that executes on one or more other computing systems to manage communications for the associated computing systems 155*a*-155*n*. The example data center further includes a System Manager module 110 that executes on one or more computing systems. In this example, each physical computing system 105*a*-105*d* hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109*a* and virtual machines 107*a* on host computing system 105*a*, and VM Communication Manager module 109*d* and virtual machines 107*d* on host computing system 105*d*. Physical computing systems 155*a*-155*n* do not execute any virtual machines in this example, and thus can each act as a computing node that directly executes one or more software programs on behalf of a user. The Communication Manager module 150 that manages communications for the associated computing systems 155*a*-155*n* can have various forms, such as, for example, a proxy computing device, firewall device, or networking device (e.g., a switch, router, hub, etc.) through which communications to and from the physical computing systems travel. In other embodiments, all or none of the physical computing systems at the data center host virtual machines.

This example data center 100 further includes multiple physical networking devices, such as switches 115*a*-115*b*, edge router devices 125*a*-125*c*, and core router devices 130*a*-130*c*. Switch 115*a* is part of a physical sub-network that includes physical computing systems 105*a*-105*c*, and is connected to edge router 125*a*. Switch 115*b* is part of a distinct physical sub-network that includes physical computing systems 105*d* and 155*a*-155*n*, as well as the computing systems providing the Communication Manager module 150 and the System Manager module 110, and is connected to edge router 125*b*. The physical sub-networks established by switches 115*a*-115*b*, in turn, are connected to each other and other networks (e.g., the global internet 135) via an intermediate interconnection network 120, which includes the edge routers 125*a*-125*c* and the core routers 130*a*-130*c*. The edge routers 125*a*-125*c* provide gateways between two or more sub-networks or networks. For example, edge router 125*a* provides a gateway between the physical sub-network established by switch 115*a* and the interconnection network 120, while edge router 125*c* provides a gateway between the interconnection network 120 and global internet 135. The core routers 130*a*-130*c* manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The System Manager module 110 and Communication Manager modules 109, 150 can configure, authorize, and otherwise manage communications between associated computing nodes, including providing logical networking functionality for one or more virtual computer networks that are provided using the computing nodes. For example, Communication Manager module 109*a* and 109*c* manages associated virtual machine computing nodes 107*a* and 107*c* and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be interconnected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107*a*1 on computing system 105*a* can be part of the same virtual local computer network as one of the virtual machine computing nodes 107*d*1 on computing system 105*d*. The virtual machine 107*a*1 can then direct an outgoing communication to the destination virtual machine computing node 107*d*1, such as by specifying a virtual network address for that destination virtual machine computing node. The Communication Manager module 109*a* receives the outgoing communication, and in at least some embodiments determines whether to authorize the sending of the outgoing communication. By filtering unauthorized communications to computing nodes, network isolation and security of entities' virtual computer networks can be enhanced.

The Communication Manager module 109*a* can determine the actual physical network location corresponding to the destination virtual network address for the communication. For example, the Communication Manager module 109*a* can determine the actual destination network address by dynamically interacting with the System Manager module 110, or can have previously determined and stored that information. The Communication Manager module 109*a* then re-headers or otherwise modifies the outgoing communication so that it is directed to Communication Manager module 109*d* using an actual substrate network address.

When Communication Manager module 109*d* receives the communication via the interconnection network 120, it obtains the virtual destination network address for the communication (e.g., by extracting the virtual destination network address from the communication), and determines to which virtual machine computing nodes 107*d* the communication is directed. The Communication Manager module 109*d* then re-headers or otherwise modifies the incoming communication so that it is directed to the destination virtual machine computing node 107*d*1 using an appropriate virtual network address for the virtual computer network, such as by using the sending virtual machine computing node 107*a*1's virtual network address as the source network address and by using the destination virtual machine computing node 107*d*1's virtual network address as the destination network address. The Communication Manager module 109*d* then forwards the modified communication to the destination virtual machine computing node 107*d*1. In at least some embodiments, before forwarding the incoming communication to the destination virtual machine, the Communication Manager module 109*d* can also perform additional steps related to security.

Further, the Communication Manager modules 109*a* and/or 109*c* on the host computing systems 105*a* and 105*c* can perform additional actions that correspond to one or more logical specified router devices lying between computing nodes 107*a*1 and 107*c*1 in the virtual network topology. For example, the source computing node 107*a*1 can direct a packet to a logical router local to computing node 107*a*1 (e.g., by including a virtual hardware address for the logical router in the packet header), with that first logical router being expected to forward the packet to the destination node 107*c*1 via the specified logical network topology. The source Communication Manager module 109*a* receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109*c* after it receives the packet.

By providing logical networking functionality, the ONM system provides various benefits. For example, because the various Communication Manager modules 109*a*, 109*d* manage the overlay virtual network and may emulate functionality of logical networking devices, the Communication Manager can be configured to pass on routing data to the WAN Status Monitor from different virtual networks. In an embodiment, the WAN Status Monitor determines network health or status on a wide area network by aggregating routing data from autonomous systems and/or network data from client networks. As the virtual networks are connected to corresponding user networks, the virtual networks receive routing data from these user networks. This allows the WAN Status Monitor to "peek" into other ASes from multiple points on the internetwork by receiving network data, such as routing data, from the user networks.

Figure 2:
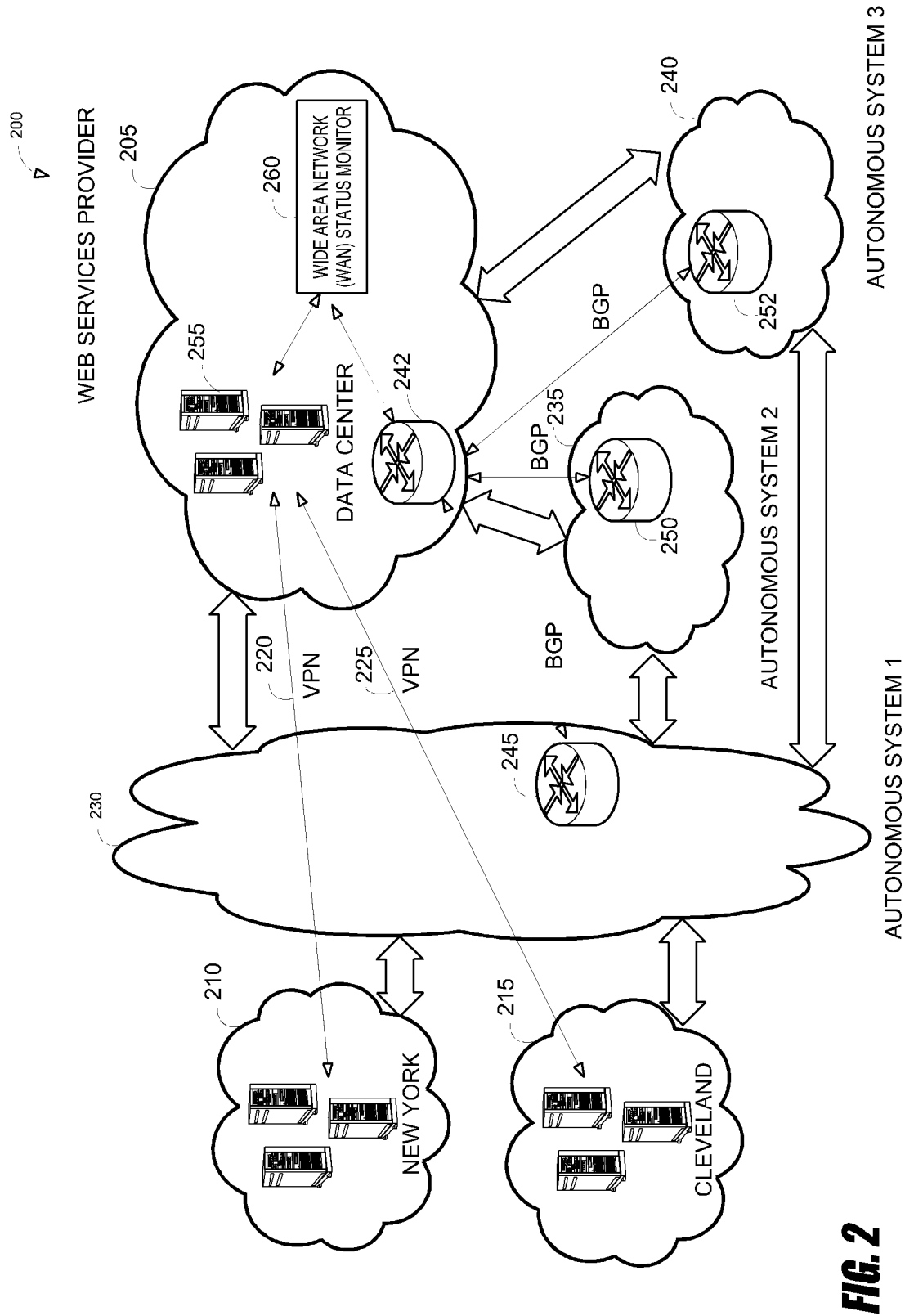
FIG. 2 illustrates a network diagram of an embodiment of a WAN monitoring system.

FIG. 2 illustrates a network diagram of an embodiment of a WAN monitoring system 200. In FIG. 2 a web services provider (WSP) 205, such as a cloud computing provider or the virtual network provider of FIG. 1, operates an autonomous system or network in communication with client or user networks in New York 210 and Cleveland 215 through autonomous system 1 (AS1) 230. The WSP can also be connected to other autonomous systems, such as autonomous system 2 (AS2) 235 and autonomous system 3 (AS3) 240. One or more routers 242 in WSP can be in communication with routers 245, 250, 252 in the autonomous systems in order to exchange routing data through an exterior routing protocol such as Border Gateway Protocol (BGP). Within the WSP, a data center 255 can provide web services to client networks 210, 215. Additionally, a Wide Area Network (WAN) Status Monitor module 260, in communication with the data center 255 and the routers 242 receives and aggregates routing data from the ASes and client networks.

The WSP 205 can provide services to customers, such as storage, computing, and network services. These customers can be operating client networks 210, 215 such as enterprise, residential, educational institution networks or the like. Typically, the client networks connect to the WSP through a virtual private network (VPN) connection 220, 225, though other forms of connections, both secured and unsecured, may be used, such as SSL, IPSec, SSH Tunneling, HTTPS, HTTP, and/or the like. In FIG. 2, communications between the client networks and the WSP traverse AS1 230, which provides a communications path between the connected client networks and other networks connected to AS1. In some cases, AS1 is an Internet Service Provider (ISP), As part of internetwork routing, autonomous systems advertise reachability information to other autonomous systems using exterior routing protocols. Most commonly, Border Gateway Protocol (BGP) is used to by autonomous systems to exchange information, though other protocols may be used. Referring back to FIG. 2, the web services provider 205 is connected to AS1 230, autonomous system 2 (AS2) 235 and autonomous system 3 (AS3) 240. One or more routers 242 operated by the WSP is in communication with respective routers 245, 250, 252 in AS1, AS2, and AS3. The routers communicate reachability information for its autonomous system to the others. For example, the AS1 router 245 can advertise that it has routes available to client networks 210 and 215, which are connected to AS1. Other autonomous systems then know that they can reach client networks 210 and 215 through AS1.

In FIG. 2, the client networks 210, 215 are in communication with a data center 255 of the WSP 205. The data center can provide various web services to clients, such as hosting services, storage, processing, or the like. In one embodiment, the data center operates an Overlay Network Manager system and provides virtual private networks for client network 210 to increase the network's capabilities by adding additional resources, such as computing or storage. The client network 210 and virtual network can be configured to behave as a single, extended network. For example, routing data can be sent as a communication from the client network to the private network through internal routing protocols, such as RIP, iBGP, IGRP, OSPF, or the like. Thus, the data center can learn the routing paths available from the client network 210.

The WAN status monitor 260 is in communication with the data center 255 and the routers 242 receive and aggregates routing data. For example, the WAN status monitor 260 can receive routing data from AS1 230 through BGP communications between its routers 242 and AS1's router 245. The WAN status monitor can also receive routing data from client network 210 from an associated virtual network operating on the WSP's data center 255. If the WSP has several clients connecting via AS1, the WAN status monitor can collect a significant amount of data about the internal routes of AS1 by aggregating the routing data from several client networks and from AS1.

Sometimes, routing data from an AS will remain unchanged while internal routes change. Therefore, monitoring client networks can provide additional data about network changes in the AS. The WAN status monitor can use this aggregated data to provide a better estimate of the network health status of routes within AS1 compared to relying only on routing data from AS1.

The WAN status monitor 260 can include one or more computing devices. In some embodiments, the WAN status monitor operates on a computing node or other computing device of the data center 255. The WAN status monitor 260 can be in communication with one or more Communication Managers and can receive routing data from virtual networks associated with a Communication Manager. In some embodiments, the WAN status monitor can be external to the data center 255 and/or receive routing data from several data centers.

Although this disclosure describes the WAN monitoring system 200 primarily in the context of a web services provider and associated client networks, the techniques described herein are applicable to other distributed network configurations. For example, the New York and Cleveland client networks 210, 215 can be sub-networks or satellite data centers of the WSP 205. Client networks 210, 215 could also be part of a content delivery network positioned throughout the Internet and reporting to the WAN Status Monitor. However, the WSP and client network configuration provides the advantage of getting data from many locations on the Internet without requiring a presence throughout the Internet.

Figure 3:
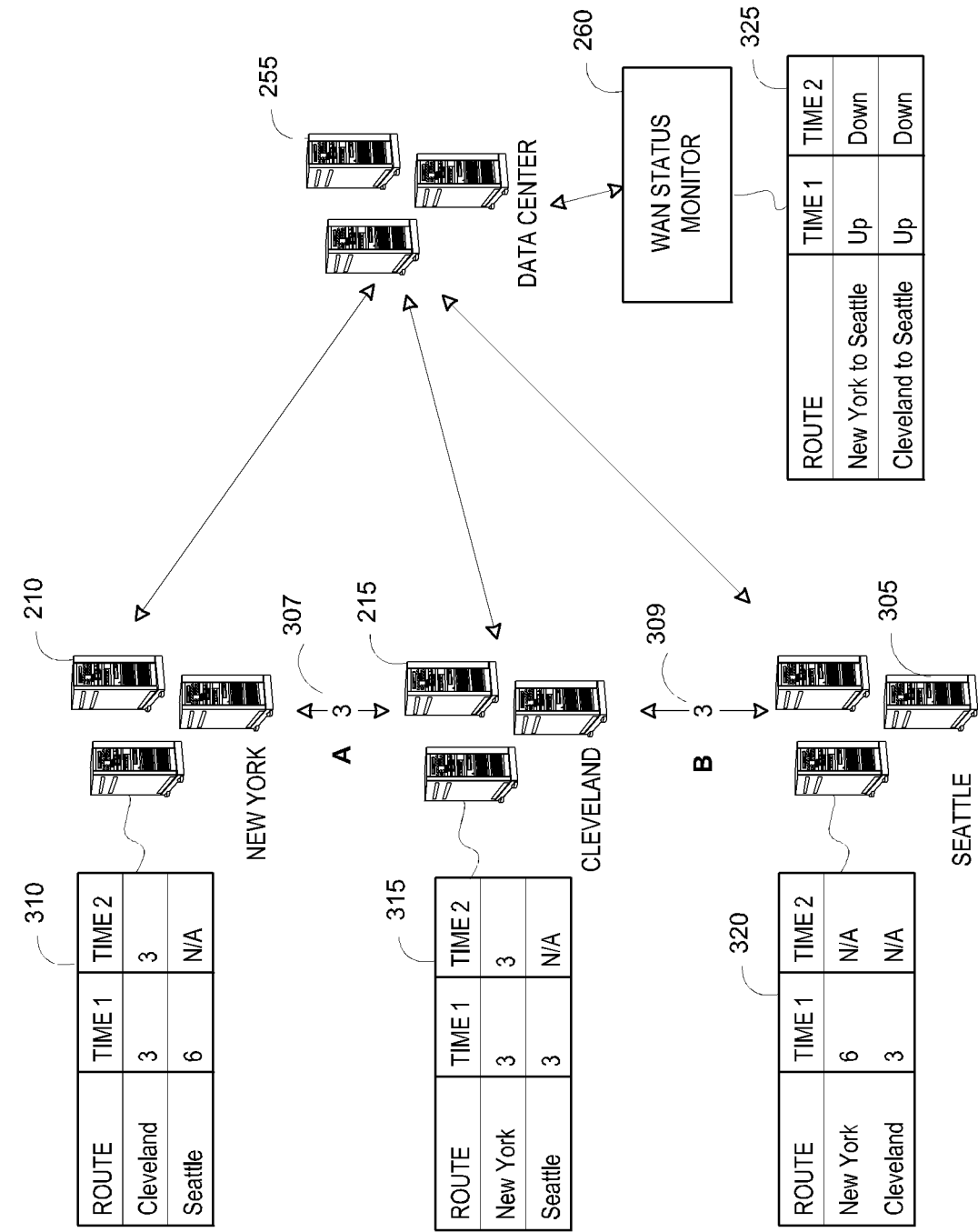
FIG. 3 illustrates a network diagram of an embodiment of the WAN Status Monitor receiving routing data from an extended network including several client networks.

FIG. 3 illustrates a network diagram of an embodiment of the WAN Status Monitor 260 receiving routing data from an extended network including several client networks. The WAN Status Monitor 260 is in communication with a data center 255, which, in turn, is in communication with client networks in New York 210, Cleveland 215, and Seattle 305. In FIG. 3, the client networks are operated by the same client (e.g. offices of the same company) and are connected to the same autonomous system (AS1), which provides internet-work connectivity to the client networks.

Route A 307, with a cost of 3, connects New York and Cleveland and can be a VPN connection. Route B 309, with a cost of 3, connects Cleveland and Seattle and can also be VPN connection. Combined route A and B connect New York and Seattle. Routing tables 310, 315, 320 associated with the client networks maintain data on the available routes from each of the client networks. Each client network has an associated virtual network operation on the data center 255, with which it is exchanging routing data. The WAN status monitor receives this routing data from the data center 255 and can record and maintain this data in a data source 325, such as a database or routing table. Typically, internal routing data includes reachability information, costs, link state and/or the like.

At time 1, both route A and route B through AS1 are up and routing tables 310, 315, 320 reflect that status. For example, routing table 320 for the Seattle network indicates that New York is reachable with a cost of 6 (through route A+route B) and Cleveland is reachable with a cost of 3 (through route B). The WAN Status Monitor 260 can receive this internal routing data from the client networks 210, 215, 305 and determine that that Route A and Route B are both operating. Thus, the WAN Status Monitor can determine that routes from New York to Cleveland to Seattle remain available within AS1.

At time 2, route B in AS1 goes down and the routing tables are updated with this information. For example, the routing table 320 for Seattle reflects that both New York and Cleveland are now unreachable while the routing table 315 form Cleveland indicates that Seattle is unreachable but that New York (route A) is still reachable. Route B may have gone down for any of various reasons, such as a fiber line being cut, a line going down, a network outage, a denial of service attach, or some other network event. As a result of route B failing, the Seattle network 305 sends updated routing data withdrawing the routes to Cleveland and New York, while the Cleveland 215 and New York 210 networks withdraw the route to Seattle.

The WAN status monitor 260 then receives the route withdrawals via data center 255. As discussed above, the routing data can be received on a virtual private networks associated with the client networks 210, 215, 305. However, network and routing data can be received in other ways. For example, in some embodiments, the client networks are operating software, such as network monitoring tools, that collect network data and transmit that data to the WAN Status Monitor.

Using heuristics or algorithms, the WAN status monitor 260 can estimate the network health of AS1. For example, based on the withdrawn routes, the WAN status monitor can determine that AS1 is bisected between Cleveland/New York and Seattle as no routes are advertised from one to the other. In some embodiments, the WAN status monitor uses the routing data, such as changes in cost information, to infer changes in the internal routes of AS1.

In some embodiments, the WAN Status Monitor 260 conducts network latency monitoring and/or receives network latency information. For example, the WAN Status Monitor 260 can cause packets to be sent from VPN connections to another VPN end point via the client networks (e.g. with client consent) to determine latency and/or latency changes on the autonomous system providing packet routing (e.g. AS1). The latency and/or latency changes of the packet route or connection can indicate the level of congestion on the autonomous system. In some embodiments, the WAN status monitor 260 analyzes latency information to determine network health. For example, step changes in latency can indicate carrier rerouting, which can be a sign of network problems or congestion. In one embodiment, a latency analysis is triggered only when receiving route updates indicating changes, in order to reduce load on the WAN status monitor.

Although the disclosure describes the WAN Status Monitor 260 as determining the network health of external networks, such as other autonomous systems, the determined status may not necessarily reflect the actual network situation of the external networks but may be a guess or approximation of the network health of the external network. For example, if some percentage of client networks withdraws routes to a particular destination, the WAN Status Monitor can determine that a route in the connecting autonomous system has gone down, but, lacking access to internal routing data from the autonomous system, the WAN Status Monitor 260 may not be able to confirm the status of the route. However, even if not completely accurate, the determined status can still provide an indication of problem areas and a starting point for troubleshooting network issues.

Figure 4:
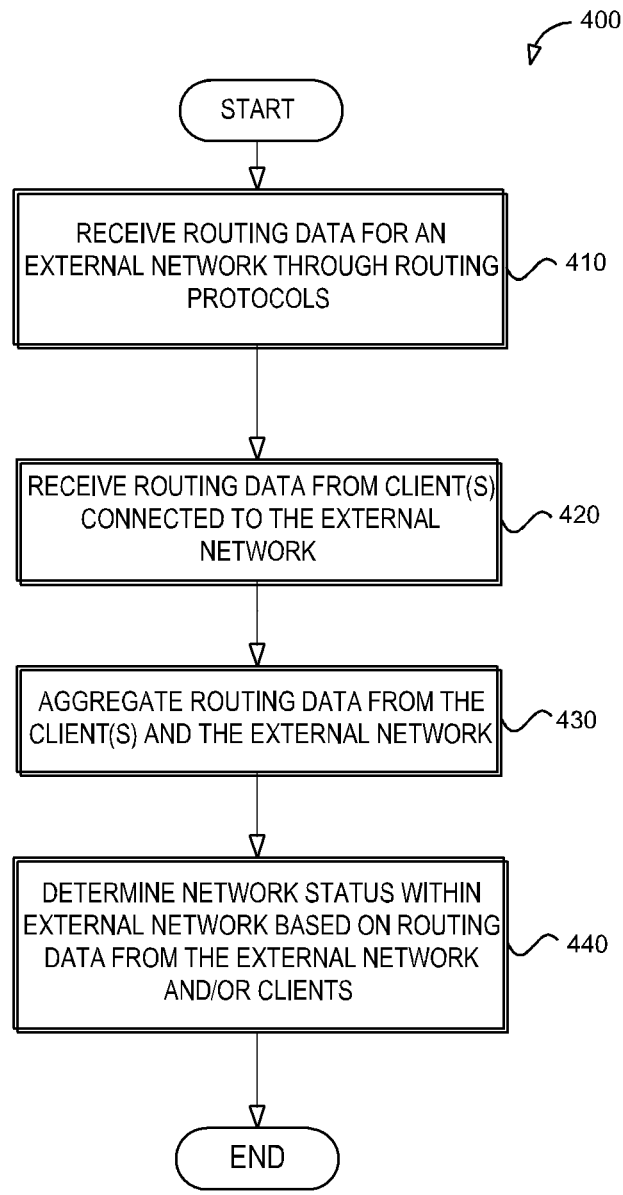
FIG. 4 illustrates a flow chart for an embodiment of a process for determining the network status of an external network.

FIG. 4 illustrates a flow chart for an embodiment of a process 400 for determining the network status of an external network. The process can be used by the WAN Status Monitor 260 of FIGS. 2 and 3 or other computing device located in a distributed network having multiple networks distinct from the external network, such as a Web Services Provider network in communication with client networks connected to the external network.

At block 410, routing data from an external network is received. Typically, the routing data is received via an exterior routing protocol, such as BGP, and provides reachability information to other networks connected to the external network. The routing data can include additional information, such as AS path, next-hop, origin, preferred AS exit point, and/or the like. Routing data from other external networks can also be received and can contain additional information about routes through the external network.

At block 420, routing data is received from clients and/or client networks connected to the external network. The routing data can include reachability information sent via an interior routing protocol, such as to a virtual network connected to the client network. Depending on the routing protocol, other information such as costs, link state, or the like can be sent.

In some embodiments, data supplemental to the routing data can be provided. For example, clients can provide additional information about their networks, such as which ASes the client networks are connected to. The supplemental data can also include link types and/or speeds, carrier service (e.g. VPN over the internet, managed service, MPLS, or the like) and customer data, such as the location, geographic area or address of a customer. Such information can be used to help identify the autonomous network providing routes to the client networks. The routing and/or supplemental data can be stored in a data store accessible to the WAN Status Monitor.

In some embodiments, the routing data from clients can include supplemental data generated from monitoring network metrics of routes through the external network. For example, network latency information on the route, such as measured on a VPN connection from the client, can be collected to estimate congestion level for the link. In another example, TCP round-trip times may be estimated based on traffic from the client networks crossing the external network. Other metrics could include bandwidth, route up-times, down-times, packet loss rates, link reliability or the like.

In some embodiments, clients may be incentivized to actively provide supplemental information through discounts, credits, or other incentives. By inducing clients to provide additional information, better data about the overall health of the other autonomous system and of the Internet as a whole can be generated.

At block 430, the WAN Status Monitor can aggregate data collected from the external network with the client routing data. Data from a set of clients can be viewed together in order to make more accurate determinations about the state of the external network. For example, if one client network reports that a route is down, additional data from other client networks can be used to confirm or deny the network change, allowing a determination of whether the network change is specific to a single client or location or whether the network outage affects a larger portion of the network.

In some instances, it may be useful to aggregate client data based on location in order to determine the network status of a geographic location and/or to determine association to an AS based on location. In one embodiment, the network location or association data is determined by performing a reverse IP lookup of an IP address from the client network. For example, if the client network has an IP address provided by an ISP, the IP lookup can reveal that the IP address is associated with that ISP. In another embodiment, the client data can be received from a data store and used to infer an association with an AS. For example, if several other clients in the same geographic area, such as a zip code or city, are associated with the same AS, then another customer from the same area is likely also associated with the same AS.

At block 440, the network health of the external network can be determined based on the routing data from the external network and/or clients. In one embodiment, the exterior routing data for the external network can be examined to detect changes in advertised routing paths in order to estimate the health of the external network. For example, the withdrawal of available routes to particular destinations can indicate that the external network has lost its connection to those destinations. Such changes can be reflected in the AS path for a route. In addition, exterior routing data from other ASes can indicate whether a particular AS is experiencing problems. For example, if other ASes remove a particular AS from an AS path for a route, that can indicate that the AS is not reachable or is experiencing some other problem.

However, not all changes within an AS are reflected by exterior routing protocols. For example, a particular internal route may go down but if an alternate internal route exists, there is likely no change in advertised routes. Therefore, also considering client routing data can provide a better determination of the health of the external network. For example, a withdrawn route between two of a customer's networks in Cleveland and New York can indicate that a physical line, router or other equipment is down or non-operating in the connecting external network. The more client networks connected to the external network, the more data about external network routes are received, such as the operating status of one or more network connections or components, giving a better idea of the health of the external network. By combining determinations based on the exterior routing data and the interior routing, a more complete picture of the health of the external network can be formed. In some embodiments, the network health information can be provided back to the client networks, which can use the network health information to make routing decisions, diagnose problems, and/or monitor Internet health.

Although the disclosure describes determining the status of a single external network, the same process can be used for multiple external networks in order to determine the health of the Internet, or at least portions of the Internet.

Figure 5:
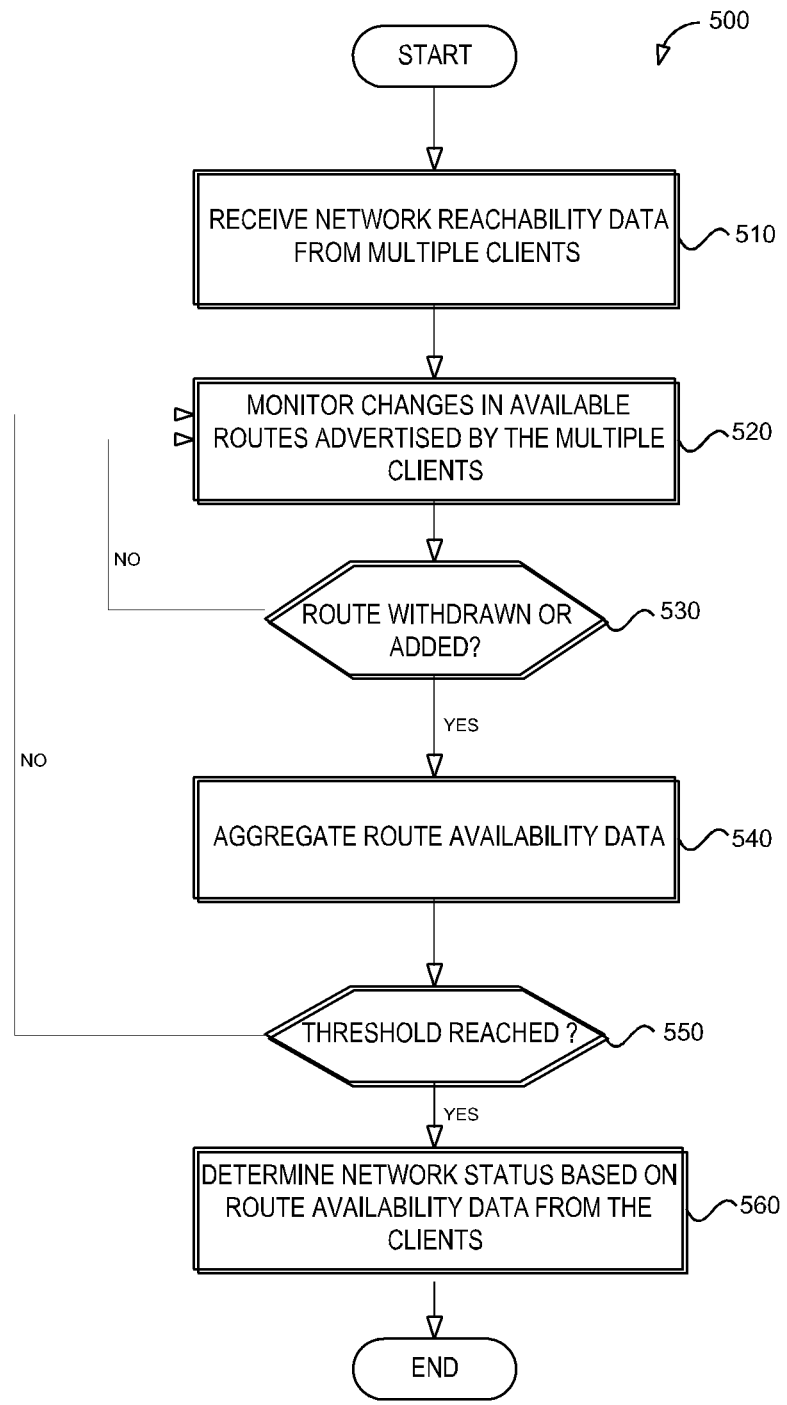
FIG. 5 illustrates a flow diagram for an embodiment of a process for determining the network status of an external network based on route availability

FIG. 5 illustrates a flow diagram for an embodiment of a process 500 for determining the network status of an external network based on route availability. Routers advertise the availability of routes and withdraw routes that are no longer available through routing updates. By monitoring these routing updates, particularly from multiple points on the external network, the network health of the external network can be determined. For example, routing data can be collected from client networks connected to different points of the external network and reported to a monitoring network.

At block 510, network reachability data is received from one or more client networks. The reachability data can be received as part of an internal routing protocol. For example, the client networks can be connected to the WSP via a VPN connection and sending routing data over the connection.

At block 520, network changes in available routes advertised by the multiple clients are monitored. As the client networks are connected to different portions of the external network, they have information available about multiple routes on the network. For example, a multi-homed client with a connection to the external network and the monitoring network can detect when the connection with the external network goes down, withdraw that route, and send the routing update via the second network connection. By tracking changes at multiple points, the severity or extent of a network change can be determined. For example, a large network outage would affect multiple client networks while a localized network outage would affect one or only a few client networks.

In one embodiment, route changes in client networks are monitored by a WAN Status Monitor in communication with virtual networks associated with the client networks. Routing data can be received on the virtual networks and sent to the WAN Status Monitor.

At decision block 530, withdrawn and/or added routes are detected. Routes can be withdrawn in various ways, such as by an explicit route withdrawal or through updated costs or updated link status causing recalculation of routes, thereby withdrawing certain routes. Similarly, routes can be added in various ways. If a routing update is received and no routes change, then monitoring can continue and the process 500 moves back to block 520. If a withdrawn and/or added route is detected, the process proceeds to 540.

At block 540, the route availability data, including withdrawn and/or added routes are aggregated together, giving a picture of the overall health of the external network. In one embodiment, the route availability data includes a status of known routes in the external network. If a previously withdrawn route is re-added, then the route availability data for that route is updated. The route availability data from a set of clients can be combined together in order to make more accurate determinations about the state of the external network, such as determining whether a network change is a single client or location even or whether the network outage affects a larger portion of the network.

As discussed above, it may be useful to aggregate client data based on location in order to determine the network status of a geographic location and/or to determine association to an AS based on location.

At decision block 550, the routing availability can optionally be checked against a threshold value in order to differentiate between local and network events. For example, if only a single client network reports a route is down, then it is likely to be a local network event affecting only that client. Therefore, it may be desirable in some embodiments to provide a filter for network events. For example, single client events can be filtered out until corroborating routing availability data is received from another client.

At block 560, the network status of the external network can be determined based on the route availability data received form multiple clients. The determined status may not necessarily reflect the actual network situation of the external network but may be a guess or approximation of the network status or health of the external network. Even if not completely accurate, the determined status can still provide an indication of problem areas and a starting point for troubleshooting network issues. As discussed above, in some embodiments, network latency or latency changes can also be monitored and used to determine network status or health.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for determining the network status of a wide area network, the system comprising:
a router interface, the router interface located within a second autonomous system distinct from a first autonomous system, the router interface configured to receive external routing data for the first autonomous system distinct from the router interface, the external routing data providing first routing information on the first autonomous system's network connections the first routing information comprising a first routing protocol configured to communicate updates between autonomous systems;
a computing system comprising one or more processors and a memory, the computing system in communication with one or more client networks distinct from the first autonomous system and the second autonomous system, the one or more client networks in communication with the first autonomous system, the computing system configured to receive internal routing data from the one or more client networks, the internal routing data providing second routing information, distinct from the first routing information, on the first autonomous system's network connections to the one or more client networks, the second routing information comprising a second routing protocol configured to communicate routing updates to routers internal to the one or more client networks, the second routing protocol distinct from the first routing protocol; and a monitoring module in communication with the router interface and the computing system, the monitoring module configured to determine network health of at least a portion of the first autonomous system based on the first routing information and the second routing information.

2. The system of claim 1, wherein the network health comprises a determination of the first autonomous system's ability to carry network traffic to a destination.

3. The system of claim 1, wherein the first and second routing information on the first autonomous system's network connections allows a determination of the operating status of a network connection.

4. The system of claim 3, wherein, in response to the determination of the operating status of the network connection the computing stem is further configured to reroute network traffic through alternative autonomous systems.

5. The system of claim 3, wherein the determination indicates a network attack.

6. The system of claim 1, wherein the network health comprises an indication of the severity of a network outage corresponding to the portion of the first autonomous system.

7. A computer-implemented method for determining a network status of a network, the method comprising:

receiving first routing data for a first network on a monitoring network, the first routing data comprising available routes through the first network, the first network located in a distinct autonomous system from the monitoring network;

receiving, from a plurality of client networks, second routing data, distinct from the first routing data, on the monitoring network for the plurality of client networks, the plurality of client networks in communication with the first network, the second routing data comprising network routes from individual client networks, at least portions of the individual network routes traversing the first network;

aggregating the second routing data for the plurality of client networks, the aggregated second routing data allowing a comparison of the network routes from individual client networks, the comparison indicating a status of the portions of the network routes from individual client networks traversing the first network; and determining a network health status of the first network based on the first routing data and the aggregated second routing data, said computer-implemented method performed by a computing system that comprises one or more computing devices.

8. The method of claim 7, wherein the first routing data comprises information on destination network addresses reachable through the first network.

9. The method of claim 7, wherein the second routing data comprises information on destination networks addresses reachable through the first network from one of the plurality of client networks.

10. The method of claim 7, wherein the first routing data comprises at least one of advertised and withdrawn routes.

11. The method of claim 7, wherein the second routing data comprises at least one of advertised and withdrawn routes.

12. The method of claim 7, wherein the network health status indicates a network attack.

13. The method of claim 7, wherein further comprising, response to determining the network health status, rerouting network traffic through alternative autonomous systems.

14. The method of claim 7, wherein the network health status comprises an indication of the severity of a network outage corresponding to the first network.

15. The method of claim 7, further comprising obtaining network performance metrics.

16. The method of claim 15, wherein the metrics include at least one of round-trip times of network packets to the plurality of client networks, latency, and latency changes.

17. A system for determining the network status of a first autonomous system, the system comprising:

a router interface, the router interface located within a second autonomous system, and being in communication with one or more external networks, the router interface configured to receive first routing data for a first external network, the first routing data including reachability information for the first external network;

a computing system comprising one or more processors and a second memory, the computing system in communication with one or more client networks distinct from the second autonomous system, the one or more client networks in communication with, but distinct from, the first autonomous system, the first autonomous system providing a communication route for the one or more client networks, the computing system configured to receive second routing data comprising network routes from the one or more client networks; and a monitoring module located within the second autonomous system, the monitoring module in communication with the router interface and the computing system, the monitoring module configured to:

compare the network routes from the one or more client networks, the comparison indicating an operational status of the portion of the network routes traversing the first autonomous system; and determine a status of a portion of the first autonomous system based on the first routing data's reachability information and the status of the portion of the network routes.

18. The system of claim 17, wherein the status of the portion of the first autonomous system indicates a network attack associated with the portion of the first autonomous system.

19. The system of claim 17, wherein the monitoring module is further configured to, in response to determining the status of the portion of the first autonomous system, reroute network traffic through alternative autonomous systems.

20. The system of claim 17, wherein the status of the portion of the first autonomous system comprises an indication of the severity of a network outage affecting the portion of the first autonomous system.

* * * * *